(12) United States Patent
Nigo et al.

(10) Patent No.: US 10,027,193 B2
(45) Date of Patent: Jul. 17, 2018

(54) EMBEDDED PERMANENT MAGNET-TYPE ELECTRIC MOTOR, COMPRESSOR, AND REFRIGERATION/AIR-CONDITIONING DEVICE

(71) Applicant: Mitsubishi Electric Corporation, Tokyo (JP)

(72) Inventors: Masahiro Nigo, Tokyo (JP); Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/121,959

(22) PCT Filed: Apr. 22, 2014

(86) PCT No.: PCT/JP2014/061286
§ 371 (c)(1),
(2) Date: Aug. 26, 2016

(87) PCT Pub. No.: WO2015/162690
PCT Pub. Date: Oct. 29, 2015

(65) Prior Publication Data
US 2017/0070109 A1  Mar. 9, 2017

(51) Int. Cl.
*H02K 1/27* (2006.01)
*H02K 21/16* (2006.01)
(Continued)

(52) U.S. Cl.
CPC ............ *H02K 1/276* (2013.01); *F04C 18/34* (2013.01); *F04C 29/0085* (2013.01); *H02K 21/16* (2013.01); *F04C 2240/40* (2013.01)

(58) Field of Classification Search
CPC ............ H02K 1/22; H02K 1/24; H02K 1/246; H02K 1/26; H02K 1/27; H02K 1/2706;
(Continued)

(56) References Cited

U.S. PATENT DOCUMENTS 6,525,442 B2 * 2/2003 Koharagi ............. H02K 1/2766
310/156.45
7,605,510 B2 * 10/2009 Okuma .................. H02K 1/276
310/156.53
(Continued)

FOREIGN PATENT DOCUMENTS

EP  2602912 A2  6/2013
JP  2001-037186 A  2/2001
(Continued)

OTHER PUBLICATIONS

International Search Report of the International Searching Authority dated Jun. 10, 2014 for the corresponding international application No. PCT/JP2014/061286 (and English translation).
(Continued)

*Primary Examiner* — Tran Nguyen
(74) *Attorney, Agent, or Firm* — Posz Law Group, PLC

(57) ABSTRACT

Provided is an interior permanent magnet motor, including: a rotor including a plurality of permanent magnets; and a stator. The rotor further includes a rotor core. The rotor core has a plurality of magnet insertion holes. A plurality of slits are formed in a region of the rotor core, which is located on a radially outer side of the magnet insertion holes. At least two of the slits are formed so that a core region sandwiched between the two slits has a portion increased toward the radially outer side.

9 Claims, 13 Drawing Sheets

(51) Int. Cl.
*F04C 18/34* (2006.01)
*F04C 29/00* (2006.01)

(58) Field of Classification Search
CPC ...... H02K 1/276; H02K 1/2766; H02K 21/12; H02K 21/14; H02K 21/16
See application file for complete search history.

(56) References Cited

U.S. PATENT DOCUMENTS

| | | | | |
|---|---|---|---|---|
| 7,808,143 | B2* | 10/2010 | Lee | H02K 1/2766 310/156.45 |
| 2007/0126304 | A1* | 6/2007 | Ito | H02K 1/2766 310/156.53 |
| 2009/0184597 | A1* | 7/2009 | Lee | H02K 1/276 310/156.56 |
| 2010/0052455 | A1* | 3/2010 | Feng | H02K 1/276 310/156.08 |
| 2013/0140922 | A1 | 6/2013 | Yabe et al. | |

FOREIGN PATENT DOCUMENTS

| | | | | |
|---|---|---|---|---|
| JP | 3424774 | B2 | 5/2003 | |
| JP | 2006014450 | A * | 1/2006 | ............ H02K 1/276 |
| JP | 2008029095 | A * | 2/2008 | ............ H02K 1/276 |
| JP | 2011-083168 | A | 4/2011 | |
| JP | 2011083168 | A * | 4/2011 | ............ H02K 1/276 |
| JP | 2011-199946 | A | 10/2011 | |
| JP | 2012-217251 | A | 11/2012 | |
| JP | 2013-126291 | A | 6/2013 | |
| WO | 2011/033397 | A2 | 3/2011 | |
| WO | 2012/026032 | A1 | 3/2012 | |
| WO | 2014/125599 | A1 | 8/2014 | |
| WO | 2015/037127 | A1 | 3/2015 | |

OTHER PUBLICATIONS

Extended European Search Report dated Nov. 22, 2017 issued in corresponding EP patent application No. 14890219.0.

* cited by examiner

EMBEDDED PERMANENT MAGNET-TYPE ELECTRIC MOTOR, COMPRESSOR, AND REFRIGERATION/AIR-CONDITIONING DEVICE

CROSS REFERENCE TO RELATED APPLICATIONS

This application is a U.S. national stage application of PCT/JP2014/061286 filed on Apr. 22, 2014, the contents of which are incorporated herein by reference.

TECHNICAL FIELD

The present invention relates to an interior permanent magnet motor, a compressor, and a refrigeration and air conditioning apparatus.

BACKGROUND ART

As a related-art interior permanent magnet motor, for example, in Patent Literature 1, there is disclosed a configuration in which a radial dimension of a slit thin portion between each of a plurality of slits and a rotator core outer peripheral portion is set larger than a radial dimension of an insertion hole end thin portion between an end air gap of a permanent magnet insertion hole and the rotator core outer peripheral portion, and the radial dimension of the slit thin portion of each of the plurality of slits is gradually increased as approaching from an inter pole toward a magnetic pole center while a radial dimension of the slit thin portion of the slit closest to the magnetic pole center is set larger than a radial dimension of the slit thin portion of the slit closest to the inter pole and smaller than a radial dimension of the slit thin portions of the other slits.

According to the configuration described above, magnetic saturation caused due to the slits arranged on a radially outer side of the permanent magnet insertion holes is reduced. Further, an effect of armature counteraction is reduced, thereby enabling reduction in torque ripple.

CITATION LIST

Patent Literature

[PTL 1] JP 5208084 B2

SUMMARY OF INVENTION

Technical Problem

When a magnetic flux density is greatly concentrated on an outer periphery of a rotor with a shape of the slit thin portions having the increased radial dimension as described above, however, it is necessary to design the slit thin portions in an increased fashion. At this time, a stator magnetic flux is liable to be linked with increased core regions. As a result, an effect of the slits to reduce a rotor magnet attraction force generated by the stator magnetic flux is disadvantageously reduced.

Further, when the slit thin portions are increased so that no slit exists in the vicinity of the rotor outer periphery, a magnetic flux density distribution on a rotor outer peripheral surface is unstable. Thus, the magnetic flux is liable to be locally concentrated in the core regions. As a result, a magnetic attraction force is generated due to an unbalanced magnetic flux density distribution on the rotor outer peripheral surface, leading to a fear of causing vibration.

The present invention has been made in view of the above, and has an object to provide an interior permanent magnet motor capable of suppressing unbalance in magnetic flux density on a rotor outer peripheral surface to reduce vibration with little change in effect of reducing a magnetic attraction force generated by a stator magnetic flux.

Solution to Problem

In order to achieve the above-mentioned object, according to one embodiment of the present invention, there is provided an interior permanent magnet motor, including: a rotor including a plurality of permanent magnets; and a stator, in which the rotor further includes a rotor core, in which the rotor core has a plurality of magnet insertion holes, in which a plurality of slits are formed in a region of the rotor core, which is located on a radially outer side of the magnet insertion holes, and in which at least two of the slits are formed so that a core region sandwiched between the two slits has a portion increased toward the radially outer side.

Further, in order to achieve the same object, according to one embodiment of the present invention, there is provided a compressor including, in an airtight container, a motor and a compression element. The motor is the above-mentioned interior permanent magnet motor of the one embodiment of the present invention.

Further, in order to achieve the same object, according to one embodiment of the present invention, there is provided a refrigeration and air conditioning apparatus including the above-mentioned compressor of the one embodiment of the present invention as a component of a refrigeration cycle.

Advantageous Effects of Invention

According to the present invention, the unbalance in magnetic flux density on the rotor outer peripheral surface can be suppressed to reduce the vibration with little change in the effect of reducing the magnetic attraction force generated by the stator magnetic flux.

DESCRIPTION OF EMBODIMENTS

Figure 1:
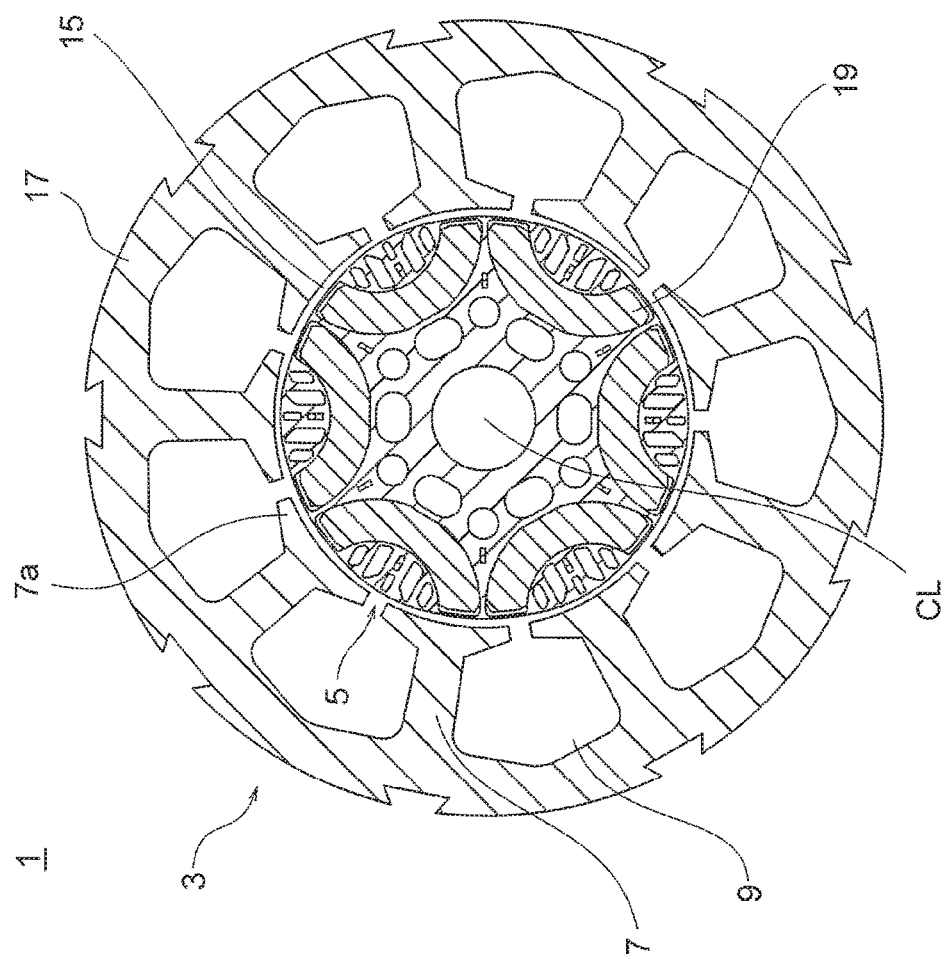
FIG. 1 is a view for illustrating a cross section orthogonal to a rotation center line of an interior permanent magnet motor according to a first embodiment of the present invention.

Now, embodiments of the present invention are described referring to the accompanying drawings. Note that, in the drawings, the same reference symbols represent the same or corresponding parts.

First Embodiment

Figure 2:
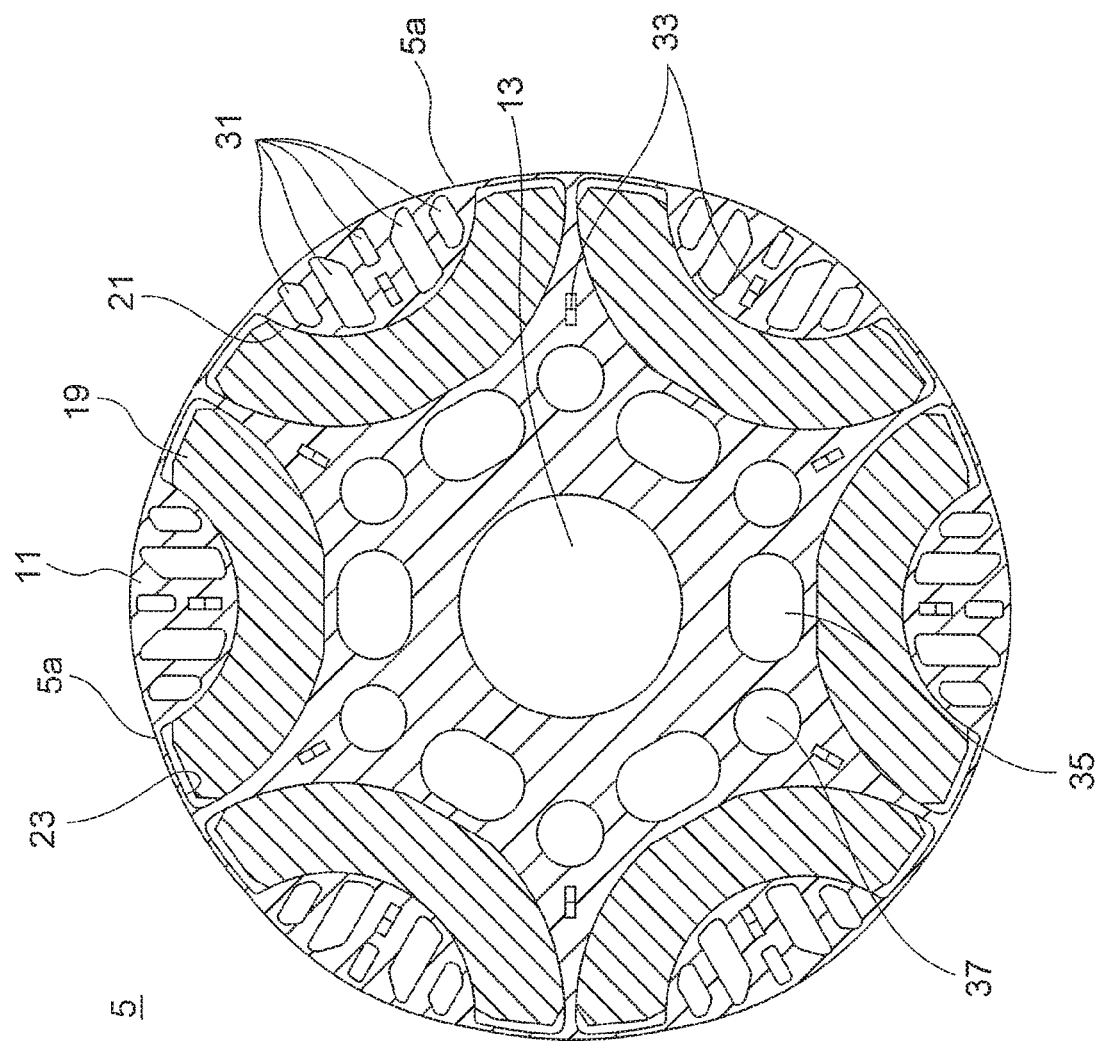
FIG. 2 is a view for illustrating a rotor in FIG. 1 in an enlarged manner.
Figure 3:
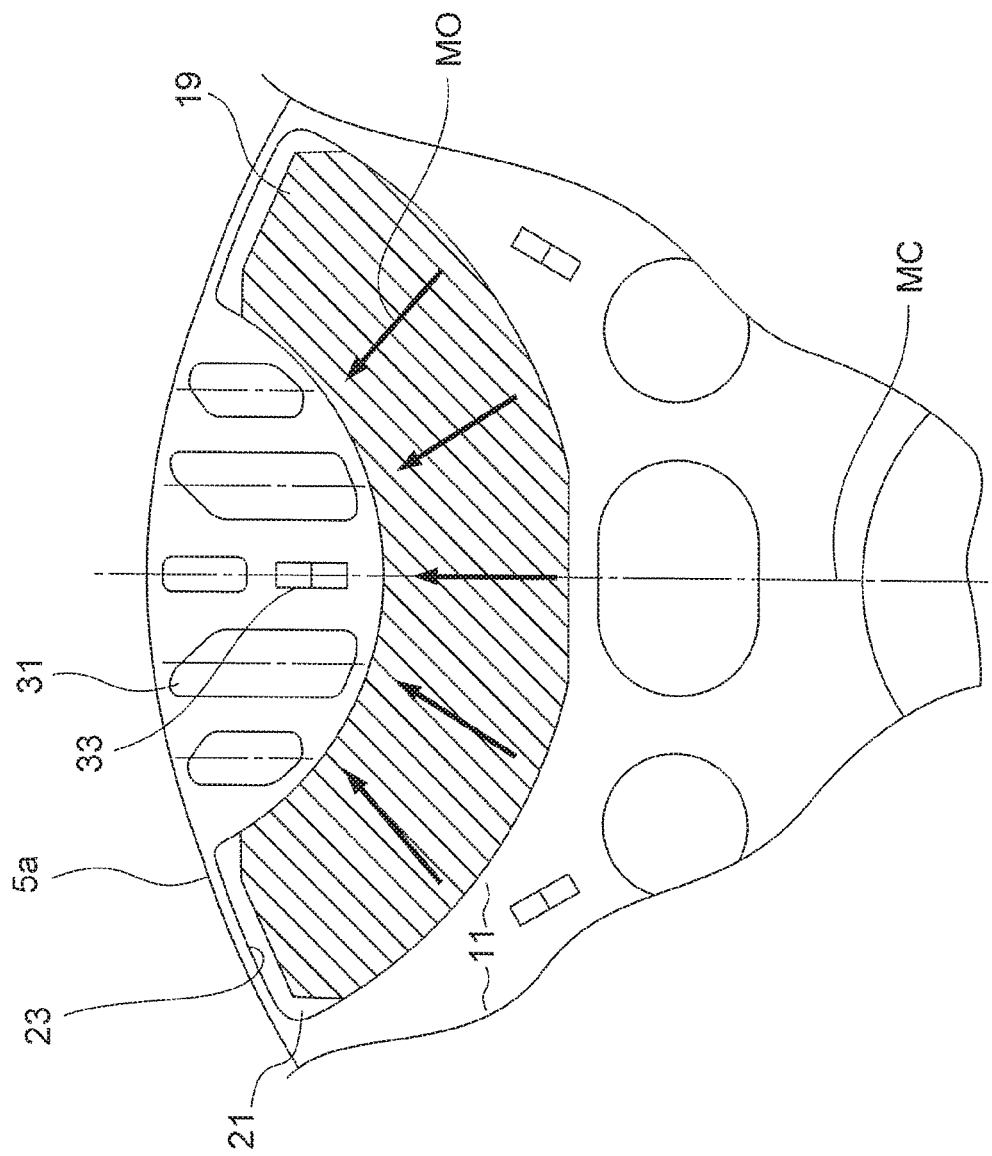
FIG. 3 is a view for illustrating a magnet insertion hole and a plurality of slits in FIG. 2 in an enlarged manner.
Figure 4:
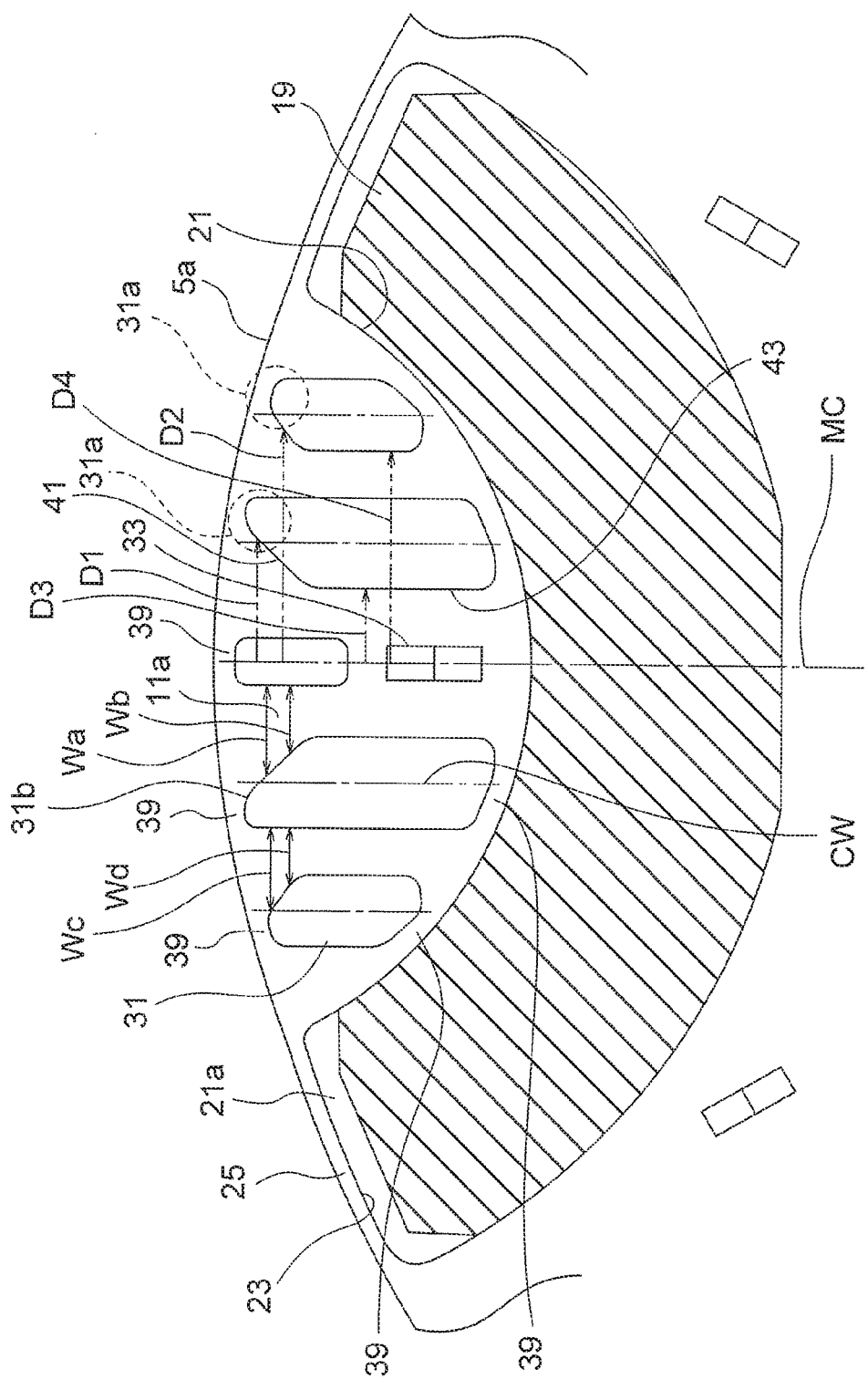
FIG. 4 is a view for illustrating the plurality of slits in FIG. 2 in a further enlarged manner.

FIG. 1 is a view for illustrating a cross section orthogonal to a rotation center line of an interior permanent magnet motor according to a first embodiment of the present invention. FIG. 2 is a view for illustrating a rotor in FIG. 1 in an enlarged manner. FIG. 3 is a view for illustrating a magnet insertion hole and a plurality of slits in FIG. 2 in an enlarged manner. FIG. 4 is a view for illustrating the plurality of slits in FIG. 2 in a further enlarged manner.

As illustrated in FIG. 1 to FIG. 4, an interior permanent magnet motor 1 includes a stator 3 and a rotor 5 rotatably arranged so as to be opposed to the stator 3. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction. A publicly-known stator winding (not shown) is wound around each of the plurality of tooth portions 7 in a publicly-known pattern.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between an outer peripheral surface of the rotor and an inner peripheral surface of the stator.

In such a configuration, the rotor 5 is held on an inner side of the stator 3 through intermediation of the air gap 15 so as to be rotatable about a rotation center line CL (rotation center of the rotor, axial line of the shaft). Specifically, a current having a frequency synchronized with an instructed number of revolutions is supplied to the stator 3 to generate a rotation magnetic field, thereby rotating the rotor 5. The air gap 15 between the stator 3 and the rotor 5 is an air gap of from 0.3 mm to 1 mm.

Next, configurations of the stator 3 and the rotor 5 are described in detail. The stator 3 includes a stator core 17. The stator core 17 is formed by punching magnetic steel plates each having a thickness of from about 0.1 mm to about 0.7 mm into a predetermined shape, and laminating a predetermined number of the magnetic steel plates while fastening the magnetic steel plates by caulking. In this case, a magnetic steel plate having a plate thickness of 0.35 mm is used.

The stator core 17 includes nine tooth portions 7 formed on a radially inner side thereof so as to be arranged approximately at equal intervals in the circumferential direction. The tooth portions 7 are formed in a radial fashion. In a region of the stator core 17, which is located between the adjacent tooth portions 7, the corresponding slot portion is formed.

Each of the tooth portions 7 extends in a radial direction and projects toward the rotation center line CL. Further, a most part of each of the tooth portions 7 has an approximately equal circumferential width from a radially outer side to a radially inner side. A tooth tip portion 7a is formed at a distal end of the tooth portion which is located on a radially innermost side. Each of the tooth tip portions 7a is formed in an umbrella-like shape having both side portions increased in the circumferential direction.

The stator windings (not shown) that form coils (not shown) configured to generate a rotation magnetic field are wound around the tooth portions 7. The coil is formed by directly winding a magnet wire around the tooth portion through intermediation of an insulating member. This winding method is called "concentrated winding". The coils are connected in a three-phase Y configuration. The number of turns and a wire diameter of the coil are determined in accordance with required characteristics (such as the number of revolutions and a torque), voltage specifications, and the sectional area of the slot. In this case, divided teeth are developed in a band-like fashion so as to facilitate winding. A magnet wire having a wire diameter (of about 1.0 mm is wound around the tooth portion of each magnetic pole to make about 80 turns. After the winding, the divided teeth are formed into an annular shape, which are then welded to form the stator.

The rotatably held shaft 13 is arranged in the vicinity of a center of the stator 3. Further, the rotor 5 is fitted onto the shaft 13. The rotor 5 includes the rotor core 11, and similarly to the stator core 17, the rotor core 11 is also formed by punching magnetic steel plates each having a thickness of from about 0.1 mm to about 0.7 mm into a predetermined shape, and laminating a predetermined number of the magnetic steel plates while fastening the magnetic steel plates by caulking. In this case, the magnetic steel plate having a plate thickness of 0.35 mm is used.

The rotor 5 is an interior magnet rotor. A plurality of permanent magnets 19 (six permanent magnets in this specific example), which are magnetized so that the N poles and the S poles are alternately located, are arranged in the rotor core 11. Each of the permanent magnets 19 is curved into an arc shape, and is arranged so that a convex portion side of the arc shape is located on the center side of the rotor 5. Each of the permanent magnets 19 is curved so as to be linearly symmetric across the corresponding magnetic pole center line. In more detail, magnet insertion holes 21 as many as the number of the plurality of permanent magnets 19 are formed in the rotor core 11. The corresponding permanent magnets 19 are inserted into a plurality of the magnet insertion holes 21, respectively. One permanent magnet 19 is inserted into one magnet insertion hole 21.

The number of magnetic poles of the rotor 5 may be any number of poles equal to or larger than two. In this embodiment, a case of six poles is exemplified. In this case, ferrite magnets are used as the permanent magnets 19. An inner peripheral surface and an outer peripheral surface of each of the ferrite magnets are respectively formed into given concentric arc shapes so that a thickness of the ferrite magnet in a radial direction of curvature is uniformly maintained to about 6 mm.

Further, magnets each applied with an oriented magnetic field from a center of the concentric arcs as indicated by the arrows MO in FIG. 3 are used as the permanent magnets 19. In addition, the magnets are inserted into the magnet insertion holes each having a shape along the magnet. As the kind of magnets, for example, rare-earth magnets containing neodymium, iron, and boron as main components may be used. The shape of each of the magnets is not limited to the arc shape, and may also be a flat plate shape. Alternatively, a plurality of the flat plate magnets may be arranged to form a magnetic pole.

An inter-pole thin portion 25 having a uniform thickness is present between a magnet side-surface opposed portion 23 of the magnet insertion hole 21, in which a side surface portion of the permanent magnet 19 is accommodated, and a rotor outer peripheral surface 5a. These inter-pole thin portions 25 each serve as a path for a leakage flux between the adjacent magnetic poles, and hence it is preferred that a thickness thereof be as small as possible. In this case, the thickness of the inter-pole thin portion 25 is set to about 0.35 mm, which is equal to the plate thickness of the magnetic steel plate, as a minimum press-working allowable width. Further, when the permanent magnet 19 is inserted into the magnet insertion hole 21, a side surface-side gap 21a is generated in the magnet insertion hole 21 between the magnet side-surface opposed portion 23 and the side surface portion of the permanent magnet 19.

In a region of the rotor core of the present invention, which is located on a radially outer side of at least one of the magnet insertion holes, a plurality of slits are formed. In the first embodiment, a plurality of slits 31 are formed in a region located on a radially outer side of each of the magnet insertion holes 21. Each of the plurality of slits 31 is an air gap portion extending from a hole defining portion of the corresponding magnet insertion hole 21, which is located on the radially outer side, to the vicinity of the rotor outer peripheral surface 5a.

As illustrated in FIG. 3 and FIG. 4, five slits that are linearly symmetric across a corresponding magnetic pole center line MC are formed as the slits 31 so that a long axis direction thereof is directed in a direction approximately parallel to the magnetic pole center line MC. In this case, one slit is formed on the magnetic pole center line MC and four slits are formed at positions linearly symmetric across the magnetic pole center line MC.

A caulking portion 33 is provided on a radially inner side of the slit formed on the magnetic pole center line MC (in a core region between the slit and the magnet insertion hole). With the caulking portion 33, a laminate in the core region of the rotor 5, which is located on the radially outer side of the magnet insertion hole 21, is fixed so as to suppress deformation occurring during manufacture. The slit formed on the magnetic pole center line MC is principally formed so as to extend from the hole defining portion of the magnet insertion hole 21, which is located on the radially outer side, to the vicinity of the rotor outer peripheral surface 5a. In this case, however, the slit is provided on the outer peripheral side of the caulking portion 33 in view of the arrangement of the caulking portion 33.

These caulking portions 33 deform the cores (steel plates) so as to fix the laminated cores (steel plates) through fitting. Therefore, a large stress is generated in caulked portions of the core. A permeability of the core (rotor core 11) has a characteristic of decreasing under the stress. In the region in which the caulking portion is arranged, the permeability decreases. Thus, a magnetic characteristic similar to that obtained when the slits are formed is obtained.

A plurality of air holes 35 and a plurality of rivet holes 37, which are arranged alternately at equal intervals in the circumferential direction, are formed on the radially inner side of the magnet insertion holes 21. The caulking portion 33 is also provided between the corresponding rivet hole 37 and a corresponding pair of the magnet insertion holes 21.

Figure 5:
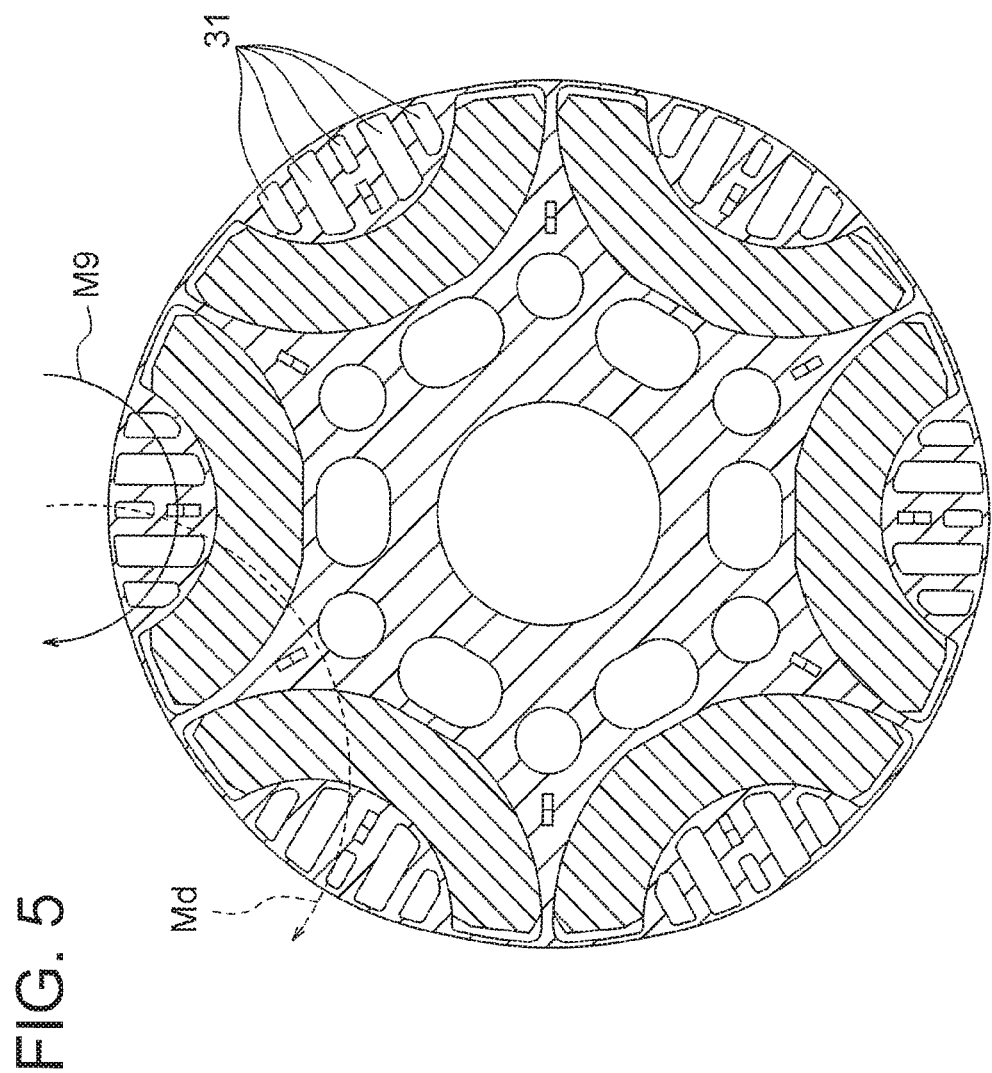
FIG. 5 is a view for illustrating linkage of a stator magnetic flux in FIG. 2.

Further, a role of the slits is described. As illustrated in FIG. 5, the interior permanent magnet motor 1 has the core regions on the radially outer side of the permanent magnets 19 of the rotor 5. Therefore, there are a d-axis direction corresponding to a magnetic pole center line direction, in which the stator magnetic flux is hardly linked, as indicated by the reference symbol Md, and a q-axis direction corresponding to a direction perpendicular to the magnetic pole center line, in which the stator magnetic flux is liable to be linked, as indicated by the reference symbol Mq. There are advantages in that a reluctance torque can be utilized owing to a salient pole difference in magnetic resistance, and that a field weakening operation can be achieved by causing a current in a d-axis phase to flow therethrough.

When a rotation center of the rotor 5 is misaligned from a rotation center of the stator 3 or unbalance occurs in the rotation magnetic field, however, unbalance occurs in rotor magnetic attraction force when the stator magnetic flux in a q-axis phase is linked with the core regions of the rotor, which are located on the radially outer side of the permanent magnets. As a result, there is a problem in that vibration is increased.

Specifically, the six-pole rotor is used in this embodiment. Therefore, six core regions are present on the radially outer side of the permanent magnets. In this case, the unbalance in the rotor magnetic attraction force at the time of linkage of the stator magnetic flux in the q-axis phase with the core regions on the radially outer side of the permanent magnets occurs six times during one revolution of the rotor. As a result, vibration of a component of order sixfold greater than the number of revolutions occurs. As a different example, vibration of a component of order fourfold greater than the number of revolutions occurs in an interior permanent magnet motor using tour magnets when the rotation center of the rotor is misaligned from the rotation center of the stator or the unbalance occurs in the rotation magnetic field.

Therefore, in order to suppress the vibration described above, the slits (air gap portions) extending from the radially outer side of the magnet insertion holes to the outer peripheral surface of the rotor are formed in the core regions of the rotor, which are located on the radially outer side of the permanent magnets. As a result, the stator magnetic flux in the q-axis phase is hardly linked with the core regions on the radially outer side of the permanent magnets to reduce the unbalance in the rotor magnet attraction force, thereby reducing the vibration. In order to reduce the unbalance in the magnetic attraction force of the rotor, which is caused by the stator magnetic flux, a slit shape, with which the stator magnetic flux in the q-axis phase is hardly linked, is preferred. More specifically, the slit having a shape that extends from the radially outer side of the magnet insertion hole to the vicinity of the outer peripheral surface of the rotor in a direction approximately parallel to the corresponding magnetic pole center line MC (long axis direction) and has a large width in a short axis direction (direction orthogonal to the long axis direction) is effective. In particular, it is preferred co arrange the slits so that a width of each of the core regions having large magnetic paths in the vicinity of the magnets, with which the stator magnetic flux is liable to be linked, is narrowed.

Specifically, a core thin portion 39 is formed between each of the slits 31 and the magnet insertion hole 21. A core thin portion 39 is also formed between each of the slits 31 and the rotor outer peripheral surface 5a. In order to suppress the linkage of the stator magnetic flux in the q-axis phase, it is preferred that each of the core thin portions 39 be as narrow as possible. In this case, a minimum width of the core thin portion (minimum interval between the slit and the magnet insertion hole or minimum interval between the slit and the rotor outer peripheral surface) is set to about 0.35 mm, which is equal to the plate thickness of the magnetic steel plate, corresponding to the minimum press-working allowable width. For the width of the slit (in the short axis direction), a width of the widest portion is about 0.5 mm to about 3 mm. Specifically, the width and the arrangement of the slits are determined so that the unbalance in the magnetic attraction force (vibration of a sixth-order component) of the rotor due to the stator magnetic flux is reduced.

Further, the slits have a role of restricting orientation of the magnetic flux of the permanent magnet. It is preferred that a magnetic flux density distribution on the rotor outer peripheral surface be a sinusoidal distribution with peaks at positions of the magnetic pole center lines of the rotor. Therefore, each of related-art slits is generally formed in a linearly symmetrical shape across the magnetic pole center line so that the orientation of the slit in the long axis direction is directed to a direction approximately parallel to the magnetic pole center line or a distal end of the slit on the rotor outer peripheral side is oriented in a direction toward the magnetic pole center line. Specifically, a width of the core region between the adjacent slits is generally formed constant from the magnet insertion hole side toward the rotor outer peripheral surface or so as to be narrower from the magnet insertion hole side toward the rotor outer peripheral surface. In this manner, the magnetic flux density of the core in the vicinity of the rotor outer peripheral surface is set so as to be increased in the vicinity of the magnetic pole center line. The magnetic flux density distribution on the rotor peripheral surface is formed as the sinusoidal distribution with the peaks at the positions of the magnetic pole center lines of the rotor by the slits, thereby also providing an effect of reducing the vibration.

Through arrangement of the slits in the core regions of the rotor, which are located on the radially outer side of the permanent magnets, however, the magnetic flux is locally concentrated in the core regions between the slits. The magnetic attraction force is generated by the unbalanced magnetic flux density distribution on the rotor outer peripheral surface, and hence sometimes causes the vibration.

Therefore, at least two slits are formed so that the core region sandwiched between the two slits has a portion increased toward the radially outer side in the present invention. In the first embodiment, the plurality of (four) slits 31 are formed so that each of all the core regions sandwiched between the adjacent slits 31 has the portion increased toward the radially outer side, which is provided on the radially outer side of each of the magnet insertion holes. Therefore, the rotor core 11 has portions 11a between the adjacent slits 31, each having a with increasing as approaching to the radially outer side. Through the formation of the slits 31 so that the above-mentioned portions 11a are formed in the rotor core 11, the concentration of the magnetic flux in the core regions located on the radially outer side of the permanent magnets can be eased, thereby suppressing the unbalance in the magnetic flux density on the rotor outer peripheral surface.

A specific description is given referring to FIG. 4. In the portions 11a of the rotor core 11 between the adjacent slits 31, width Wa of radially outer portion>width Wb of radially inner portion and width Wc of radially outer portion>width Wd of radially inner portion are satisfied. Further, the above-mentioned configuration is described in terms of the slits. Then, each of the slits 31 located away from the magnetic pole center line MC includes a first portion 41 and a second portion 43 on the magnetic pole center line side. The first portions 41 are located on the rotor outer peripheral surface side. Distances D1 and D2 from the magnetic pole center line MC to the first portions 41 increase from the radially inner side toward the radially outer side. The second portions 43 are located on the magnetic insertion hole 21 side. Distances D3 and D4 from the magnetic pole center line MC to the second portions 43 are constant. Each of ends 31a on the rotor outer peripheral surface side has a rounded shape on the magnetic pole center line MC side with the first portion 41. A width of the slits 31 is constant on the magnetic insertion hole side and is decreased on the rotor outer peripheral surface side.

The magnetic flux density on the rotor outer peripheral surface 5 is susceptible to the effect of the magnetic flux density of the core regions located on the radially outer side. Therefore, through formation of the slits so that the width of the core regions between the adjacent slits is increased on the rotor outer peripheral surface side, the unbalance in the magnetic flux density on the rotor outer peripheral surface is suppressed with little change in the effect of reducing the magnetic attraction force generated by the stator magnetic flux, which is the original object. As a result, the motor with reduced vibration can be constructed.

The present invention is not limited to the form in which the width of the core region between the adjacent slits of all the plurality of slits is increased on the rotor outer peripheral surface side.

Further, it is preferred that the magnetic flux density distribution on the rotor outer peripheral surface be the sinusoidal distribution having the peaks at the positions of the magnetic pole center lines of the rotor. The magnetic flux density of the core in the vicinity of the rotor outer peripheral surface is set so as to be increased in the vicinity of the magnetic pole center lines in many cases. In the first embodiment, an outermost end 31b of each of the slits 31 is located on an outer side (side away from the corresponding magnetic pole center line MC) of a width center line CW of each of the silts 31 (line passing through a center of the width of the slit, which is parallel to the corresponding magnetic pole centerline MC). The outermost end 31b is a distal end of a tapered portion of each of the slits 31 on the rotor outer peripheral surface side, and is a distal end extended to the highest degree toward the rotor outer peripheral surface side in terms of extension of the slits 31 in the direction of the width center line CW. Through the formation described above, the magnetic paths on the magnetic pole center line side are particularly increased to enable the easing of concentration of the magnetic flux density, which is effective in the suppression of the unbalance in the magnetic flux density on the rotor outer peripheral surface.

Figure 6:
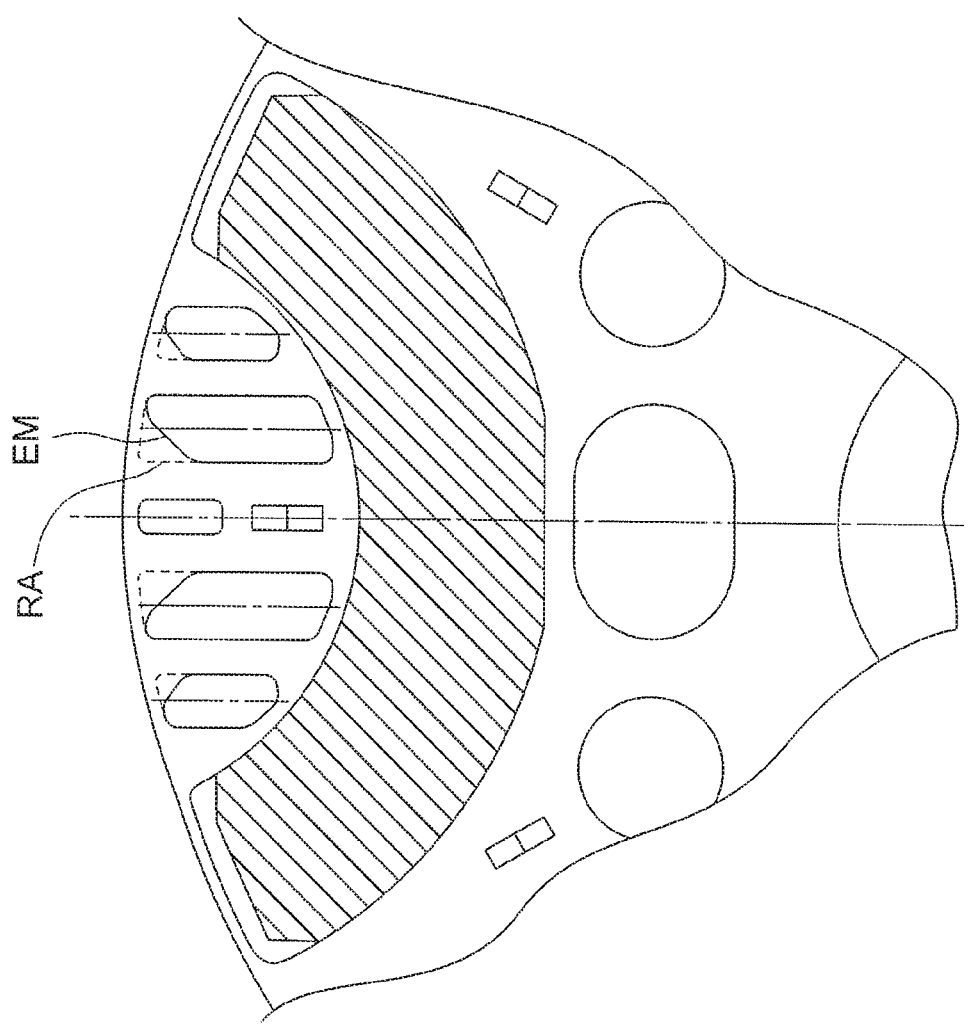
FIG. 6 is a view for illustrating the slits according to the first embodiment and slits according to a comparative example in the same manner as in FIG. 3.

Next, referring to FIG. 6 to FIG. 9, the effects of the first embodiment are described. FIG. 6 is a view for illustrating the slits according to the first embodiment and slits according to a comparative example in the same manner as in FIG. 3.

As illustrated in FIG. 6, the slits according to the first embodiment are denoted by the reference symbol EM. The slits according to the comparative example have approximately constant widths as indicated by the dotted lines RA.

Figure 7:
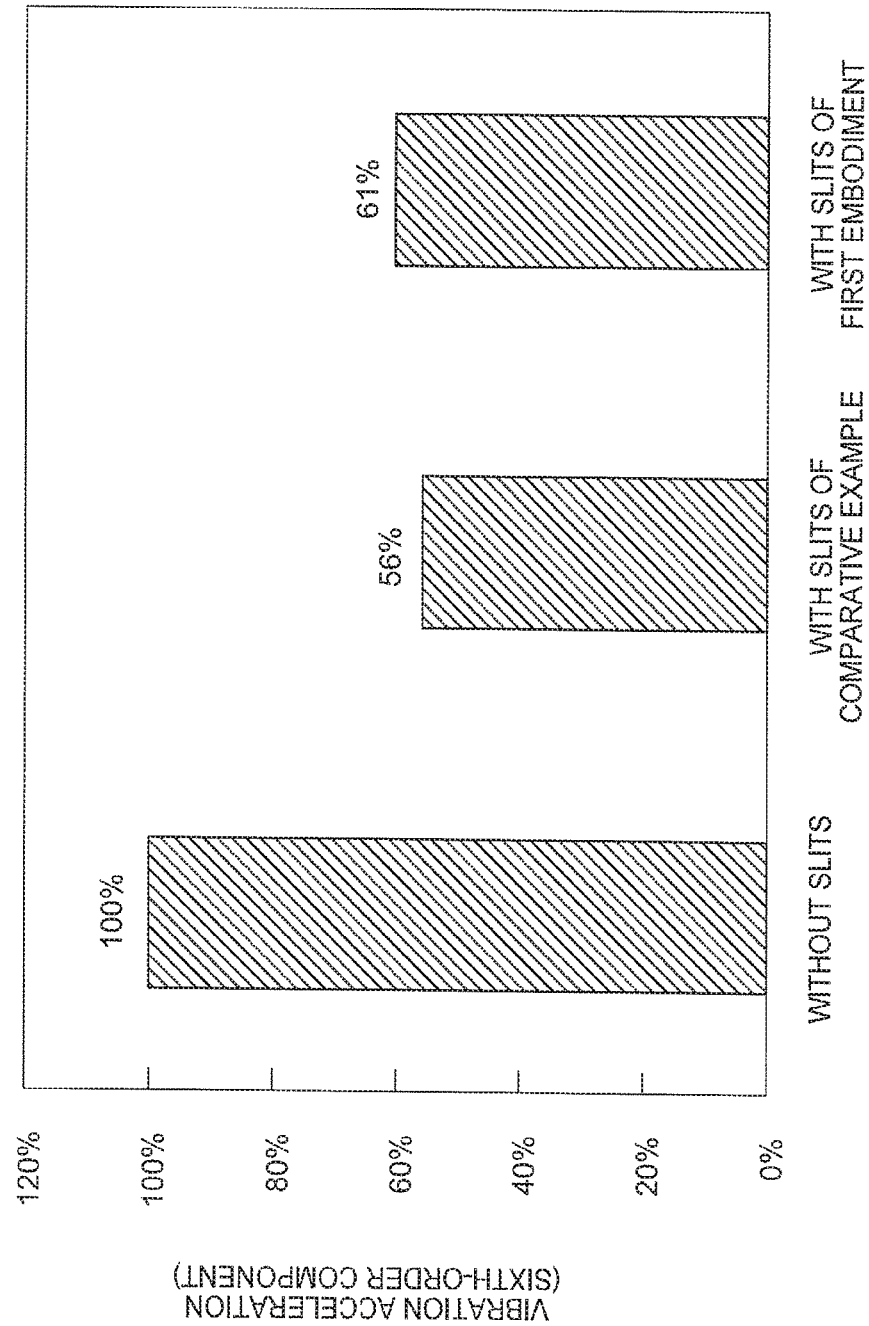
FIG. 7 is a graph for showing results (sixth-order components) of extraction of an acceleration at a stator outer peripheral portion, which correspond to results of analysis of vibration during driving, under a state in which a rotation center of the rotor is misaligned from a rotation center of a stator.

FIG. 7 is a graph for showing results of extraction of an acceleration (sixth-order components frequency sixfold greater than the number of revolutions) at the stator outer peripheral portion, which correspond to results of analysis of vibration during driving, for each of the rotor having the slits according to the first embodiment, a rotor having the slits according to the comparative example, and a rotor without slits, under a state in which the rotation center of the rotor is misaligned (decentered) from the rotation center of the stator.

As can be seen from the results shown in FIG. 7, it is understood that the sixth-order component of the acceleration is significantly reduced in the rotor having the slits according to the first embodiment and the rotor having the slits according to the comparative example in comparison to the rotor without slits.

It can be said that the stator magnetic flux in the q-axis phase is hardly linked with the core regions of the rotor, which are located on the outer peripheral side of the permanent magnets, so that the unbalance in the rotor magnet attraction force is reduced to provide the great effect of reducing the vibration.

Figure 8:
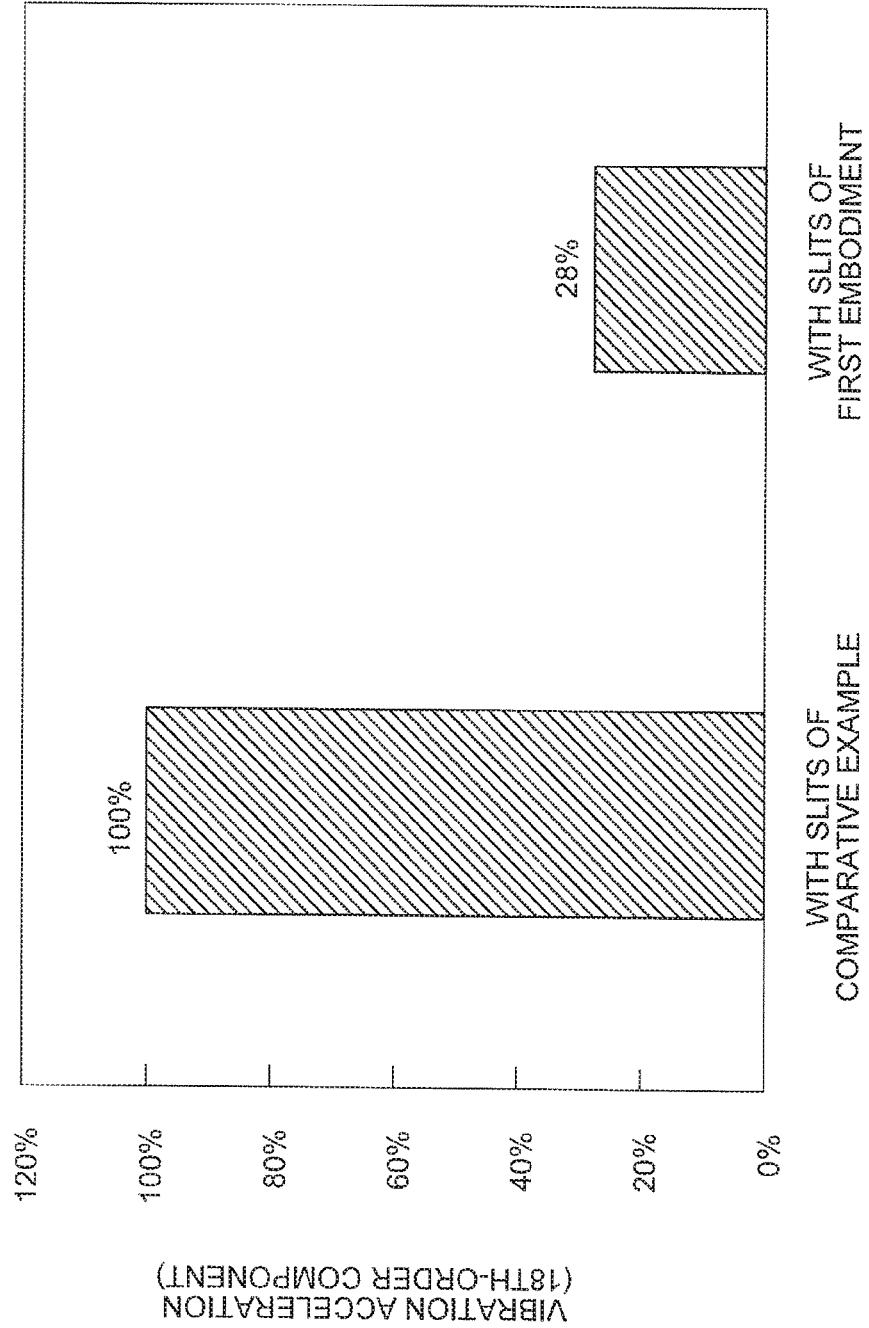
FIG. 8 is a graph for showing results (18th-order components) of extraction of an acceleration at the stator outer peripheral portion, which correspond to results of analysis of vibration during driving, under the state in which the rotation center of the rotor is misaligned from the rotation center of the stator.
Figure 9:
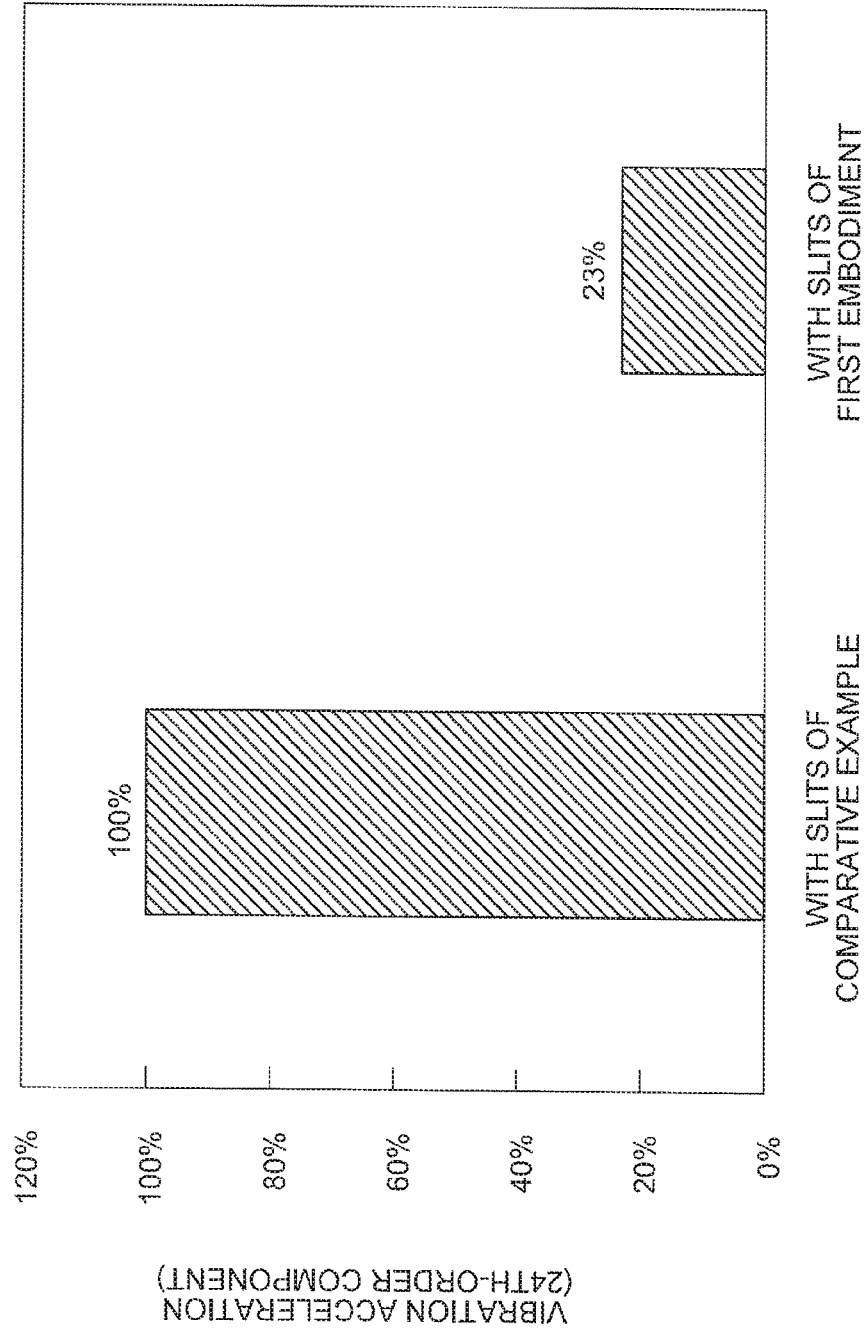
FIG. 9 is a graph for showing results (24th-order components) of extraction of an acceleration at the stator outer peripheral portion, which correspond to results of analysis of vibration during driving, under the state in which the rotation center of the rotor is misaligned from the rotation center of the stator.

Further, FIG. 8 and FIG. 9 are graphs for showing results of extraction of accelerations (18th order: frequency 18-fold greater the number of revolutions, 24th order: frequency 24-fold greater the number of revolutions) at the stator outer peripheral portions, which correspond to results of analysis of the vibration during driving, for the rotor having the slits according to the first embodiment and the rotor having the slits according to the comparative example, under the state in which the rotation center of the rotor is misaligned (decentered) from the rotation center of the stator. In this case, the 18th order and the 24th order, at which the acceleration at the stator outer peripheral portion is higher among high orders, are selected as representative examples.

As can be seen from the results shown in FIG. 8, it is understood that the 18th-order component of the acceleration of the rotor having the slits according to the first embodiment is successfully reduced to 28% of the 18th-order component of the acceleration of the rotor having the slits according to the comparative example. Further, as can be seen from the results shown in FIG. 9, it is understood that the 24th-order component of the acceleration of the rotor having the slits according to the first embodiment is successfully reduced to 23% of the 24th-order component of the acceleration of the rotor having the slits according to the comparative example.

The 18th-order vibration and the 24th-order vibration are order components generated due to the unbalance in the magnetic flux density distribution on the rotor outer peripheral surface in contrast to the sixth-order component that is generated due to the occurrence of unbalance in the rotor magnetic attraction force when the stator magnetic flux in the q-axis phase is linked with the core regions of the rotor, which are located on the radially outer side of the magnetic insertion holes. As compared to the slits of the comparative example, the slits of the first embodiment ease the concentration of the magnetic flux in the core regions of the rotor, which are located on the radially outer side of the magnetic insertion holes, to suppress the unbalance in the magnetic flux density on the rotor outer peripheral surface, thereby suppressing the acceleration of the vibration.

Further, in the first embodiment, each of the permanent magnets is curved into an arc shape, and the convex portion side of the arc shape is arranged on the center side of the rotor. Specifically, each of the permanent magnets is arranged to be inclined in linear symmetry across the magnetic pole center line so as to be located on a radially innermost side on the magnetic pole center line.

In the case of the rotor in which each of the permanent magnets is arranged to be inclined. In linear symmetry across the magnetic pole center line so as to be located on the radially innermost side on the magnetic pole center line, the magnetic flux of the permanent magnet is concentrated on the magnetic pole center line. Therefore, the magnetic flux density of the core in the vicinity of the rotor outer periphery is particularly increased in the vicinity of the magnetic pole center line. Thus, the slits are extremely effective in the suppression of the unbalance in the magnetic flux density on the rotor outer peripheral surface.

Although the rotor using the ferrite magnets is described in this embodiment, a residual magnetic flux density of the rare-earth magnets is higher than that of the ferrite magnets also in the case of the rotor using the rare-earth magnets, resulting in a high magnetic flux density of the core in the vicinity of the rotor outer periphery. Therefore, the easing of the magnetic flux density with the above-mentioned slits is effective.

According to the interior permanent magnet motor of the first embodiment, which is constructed as described above, the slits are formed so that the width of the core region between the adjacent slits is increased on the rotor outer peripheral side. Thus, the unbalance in the magnetic flux density on the rotor outer peripheral surface is suppressed with little change in the effect of reducing the magnetic attraction force generated by the stator magnetic flux, which is the original object. As a result, the motor with reduced vibration can be constructed.

Second Embodiment

Figure 10:
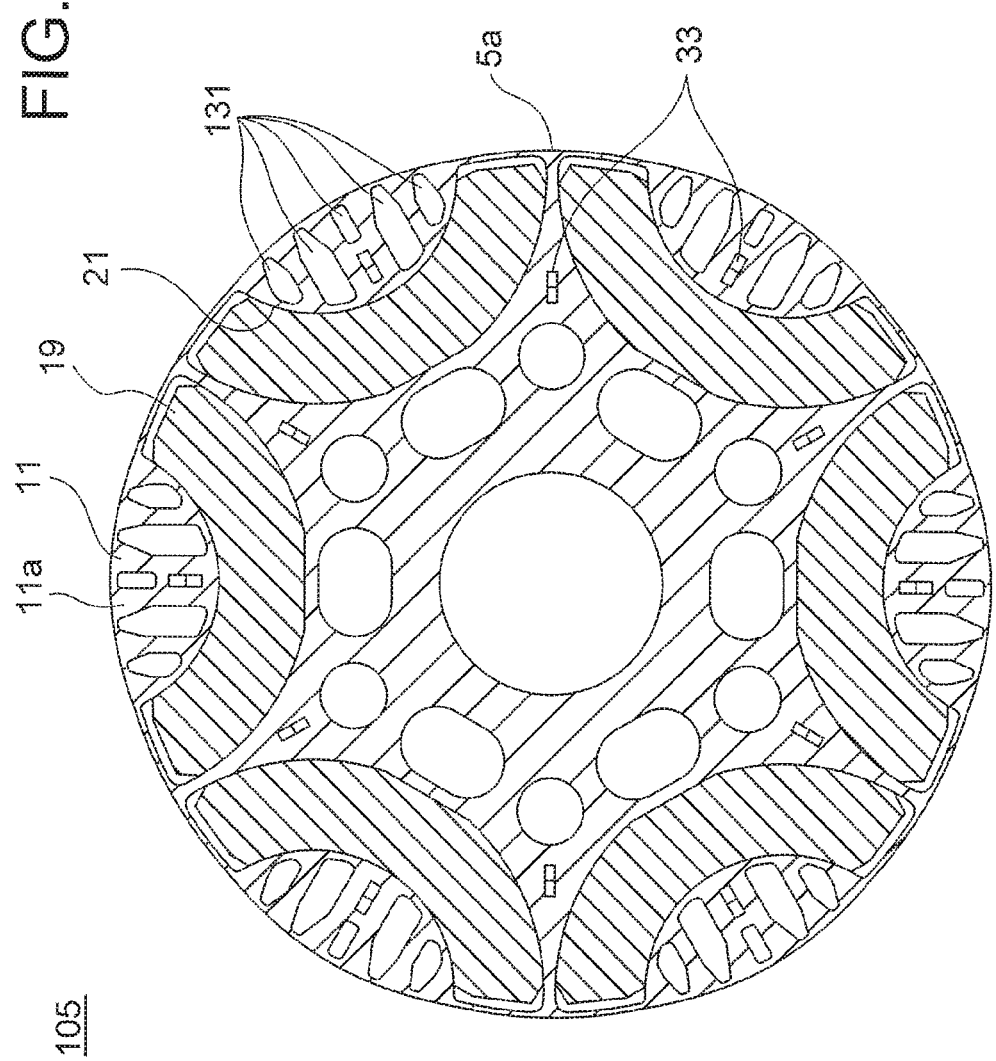
FIG. 10 is a view for illustrating a second embodiment of the present invention in the same manner as in FIG. 2.

Next, a second embodiment of the present invention is described. FIG. 10 is a view for illustrating the second embodiment in the same manner as in FIG. 2. The second embodiment is the same as the first embodiment described above except for parts to be described below.

In a rotor 105 according to the second embodiment, ends of slits 131 on the rotor outer peripheral surface side have rounded shapes on both the corresponding magnetic pole center line MC side and an opposite side of the magnetic pole center line MC. In the long axis direction of the slits 131, each of the slits 131 has such a shape that a width is constant on the magnetic insertion hole side and is narrowed on the rotor outer peripheral surface side.

Even with the slits having the shape described above, a tapered portion (outermost end) on the rotor outer peripheral surface side is arranged so as to be close to the outer side with respect to the magnetic pole center line of each of the slits. Through the formation as described above, in particular, the magnetic paths on the magnetic pole center line side are increased to enable the easing of the concentration of the magnetic flux density, which is effective in the suppression of unbalance in the magnetic flux density on the rotor outer peripheral surface.

Third Embodiment

Figure 11:
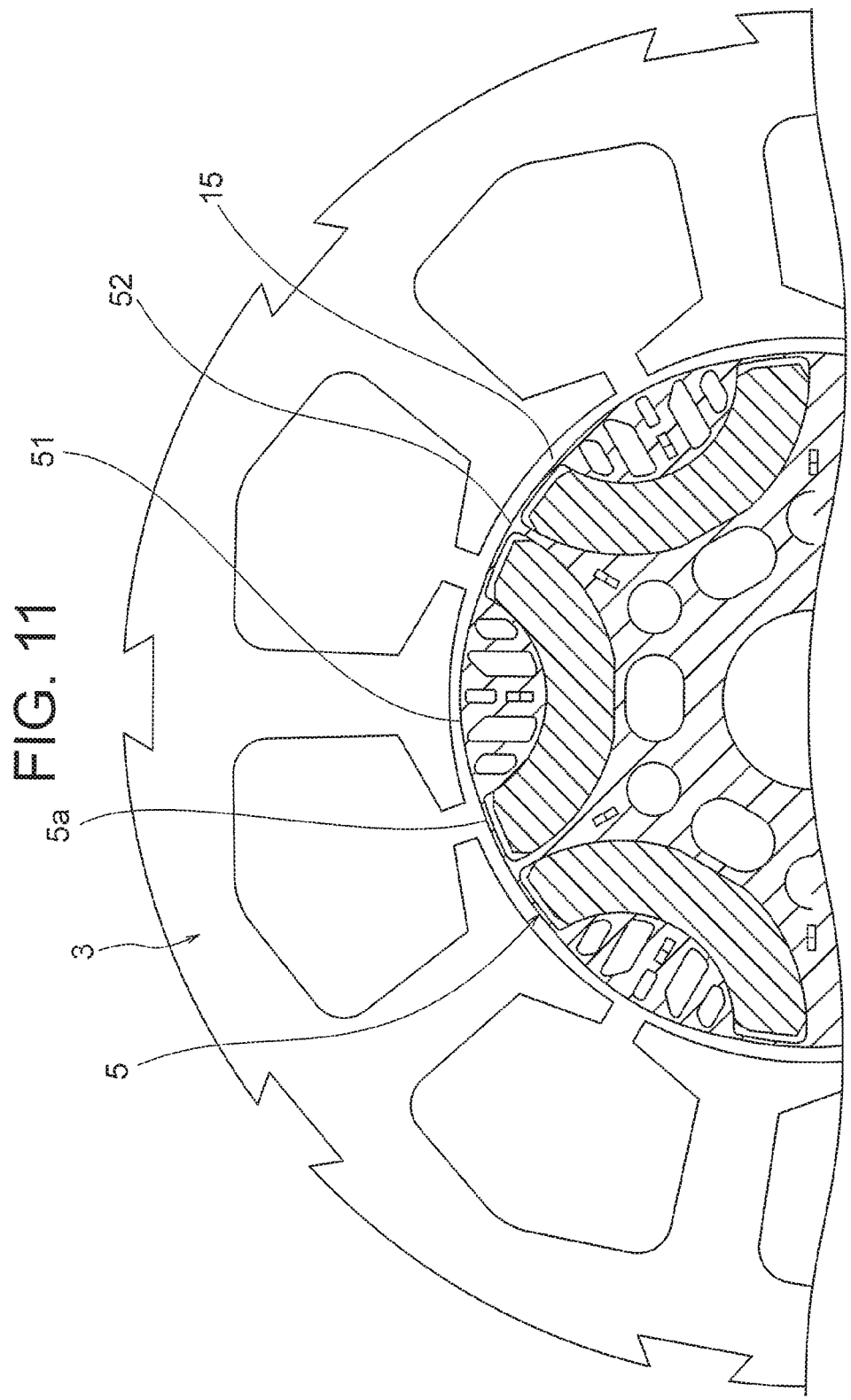
FIG. 11 is a view for illustrating a relationship between the stator and the rotor according to a third embodiment of the present invention.

Next, a third embodiment of the present invention is described. FIG. 11 is a view for illustrating a relationship between the rotor and the stator according to the third embodiment. The third embodiment is the same as the first embodiment or the second embodiment described above except for parts to be described below. Although FIG. 11 is a view for illustrating the slits of the first embodiment as an example for convenience of the illustration, the present invention may also be carried out with the slits of the second embodiment.

Magnetic pole center regions of the outer peripheral surface 5a of the rotor bulge toward the radially outer side to a high degree than inter-pole, regions of the outer peripheral surface 5a of the rotor. Specifically, the rotor outer peripheral surface 5a includes first arcs 51 and second arcs 52. Each of the first arcs 51 has a portion located on the magnetic pole center line, which bulges toward the radially outer side to the highest degree. Thus, an air gap between the stator 3 and each of the inter-pole regions of the rotor 5 is larger than an air gap between the stator 3 and each of the magnetic pole center regions of the rotor 5. As a specific example, a description is given referring to FIG. 12. Then, the air gap located on the magnetic pole center line, which becomes minimum in the air gap 15 between the first arc 51 of the rotor outer peripheral surface 5a and the stator inner peripheral surface, is 0.6 mm. Further, an air gap located on a boundary line passing through an intersection (connecting point, boundary point) between the first arc 51 and the second arc 52 is 0.9 mm. The air gap 15 between the first arc 51 and the stator inner peripheral surface decreases as approaching to an interpole center line within a range of the first arc 51, whereas an air gap between the second arc 52 and the stator inner peripheral surface is uniform within a range of the second arc. Each of the first arcs 51 and a pair of the second arcs adjacent thereto on both sides are formed linearly symmetric across the inter-pole center line of the first arc.

According to the interior permanent magnet motor constructed as described above, the core regions (magnetic paths) are increased on the rotor outer peripheral surface side by the slits to enable the easing of the concentration of the magnetic flux. Further, the air gap between the rotor outer peripheral surface and the stator inner peripheral surface is formed so as to be increased from the magnetic pole center regions toward the inter-pole regions. Therefore, a magnetic resistance on the rotor surface increases from the magnetic pole center regions toward the inter-pole regions A magnetic resistance on the rotor outer surface increases from the magnetic pole center regions toward the inter-pole regions, and hence the magnetic flux density distribution on the rotor surface becomes close to a sinusoidal wave having peaks at the positions of the magnetic pole center regions. As a result, high-frequency components of the magnetic flux density can be decreased to reduce vibration noise of the motor.

Fourth Embodiment

Next, there is described a rotary compressor having the interior permanent magnet motor according to the above-mentioned embodiment mounted therein. The present invention encompasses a compressor having the interior permanent magnet motor according to any one of the above-mentioned embodiments mounted therein. However, the type of the compressor is not limited to the rotary compressor.

Figure 12:
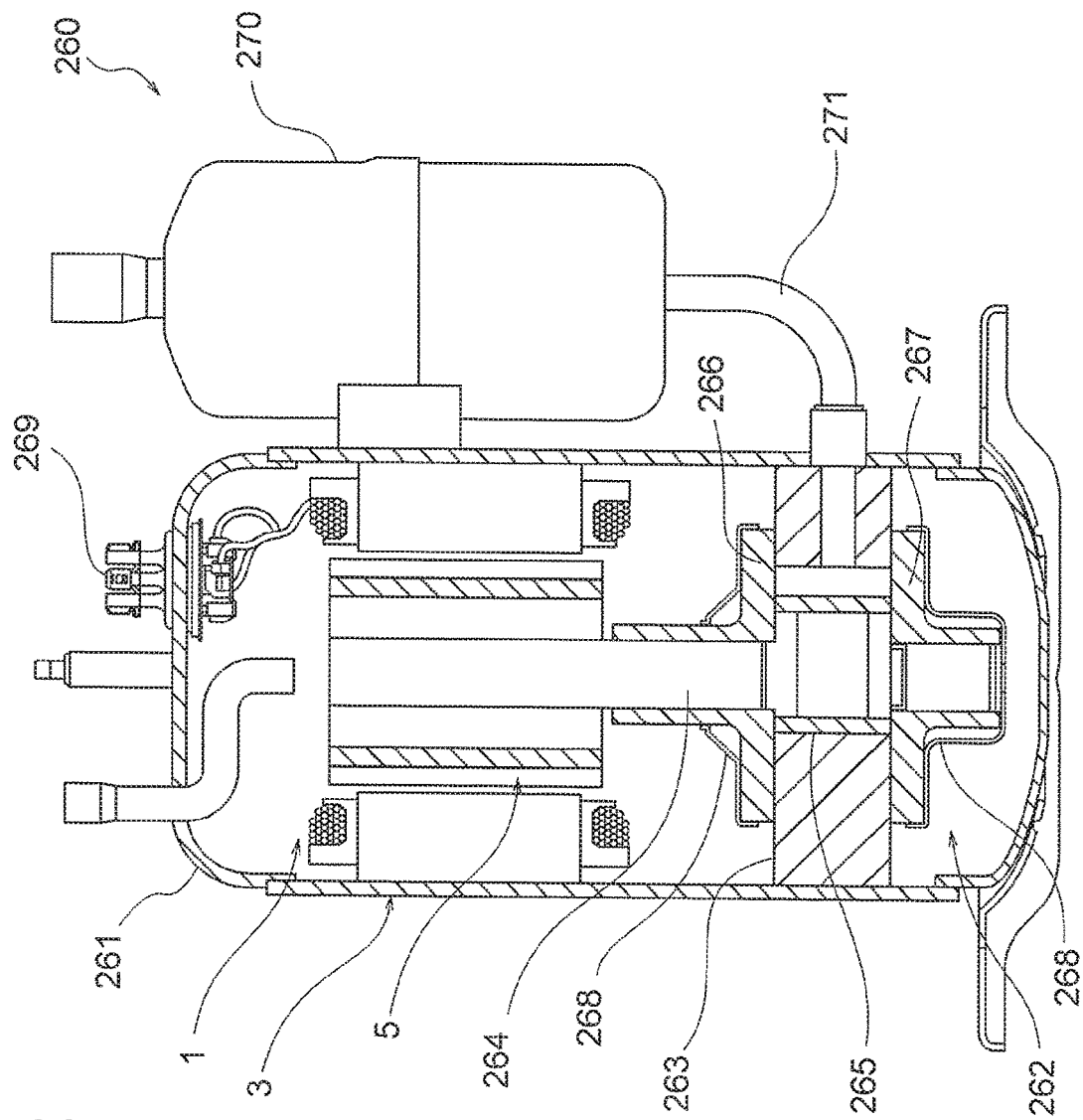
FIG. 12 is a vertical sectional view of a compressor according to a fourth embodiment of the present invention.

FIG. 12 is a vertical sectional view of the rotary compressor having the interior permanent magnet motor mounted therein. A rotary compressor 260 includes the interior permanent magnet motor (motor element) 1 and a compression element 262 in an airtight container 261. Although not illustrated, a refrigerating machine oil for lubricating each of sliding portions of the compression element is stored in a bottom portion of the airtight container 261.

The compression element 262 includes, as main components thereof, a cylinder 263 arranged in a vertically stacked state, a rotary shaft 264 serving as the shaft 13 rotated by the interior permanent magnet motor 1, a piston 265 to be fitted by insertion into the rotary shaft 264, a vane (not shown) dividing an inside of the cylinder 263 into an intake side and a compression side, an upper frame 266 and a lower frame 267 being a pair of upper and lower frames into which the rotary shaft 264 is to be rotatably fitted by insertion and which are configured to close axial end surfaces of the cylinder 263, and mufflers 268 mounted on the upper frame 266 and the lower frame 267, respectively.

The stator 3 of the interior permanent magnet motor 1 is directly fixed to the airtight container 261 by a method such as shrink fitting or welding and is held thereby. A coil of the stator 3 is supplied with power from a glass terminal 269 fixed to the airtight container 261.

The rotor 5 is arranged through intermediation of the air gap 15 on a radially inner side of the stator 3, and is held in a rotatable state by bearing portions (upper frame and lower frame) of the compression element 262 via the rotary shaft 264 in the center portion of the rotor 5.

Next, an operation of the rotary compressor (260) is described. A refrigerant gas supplied from an accumulator 270 is taken into the cylinder 263 through an intake pipe 271 fixed to the airtight container 261. The interior permanent magnet motor 1 is rotated by energization of an inverter so that the piston 265 fitted to the rotary shaft 264 is rotated in the cylinder 263. With this, the refrigerant is compressed in the cylinder 263.

The refrigerant, which has passed through the muffler, rises in the airtight container 261. At this time, the refrigerating machine oil is mixed into the compressed refrigerant. When the mixture of the refrigerant and the refrigerating machine oil passes through air holes formed in the rotor core, the refrigerant and the refrigerating machine oil are promoted to be separated from each other, and hence the refrigerating machine oil can be prevented from flowing into a discharge pipe 272. In this manner, the compressed refrigerant is supplied on a high-pressure side of the refrigeration cycle through the discharge pipe 272 arranged on the airtight container 264.

As the refrigerant for the rotary compressor, R410A, R407C, R22, or the like that has hitherto been used may be used, but any refrigerant such as a refrigerant having a low global warming potential (GWP) may also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf ($CF_3CF=CH_2$) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practice.

Even in the rotary compressor constructed as described above, with the use of the interior permanent magnet motor described above, the concentration of the magnetic flux in the core regions of the rotor, which are located on the radially outer side of the permanent magnets, is eased to suppress the unbalance in the magnetic flux density on the rotor outer peripheral surface. In this manner, the vibration can be suppressed. In particular, load fluctuations occur due to a compression mechanism during driving in the motor for a compressor, and hence local concentration of the magnetic flux is liable to occur in the core regions in the vicinity of the rotor outer periphery. Thus, it is effective to ease the magnetic flux density with the slits.

Fifth Embodiment

Figure 13:
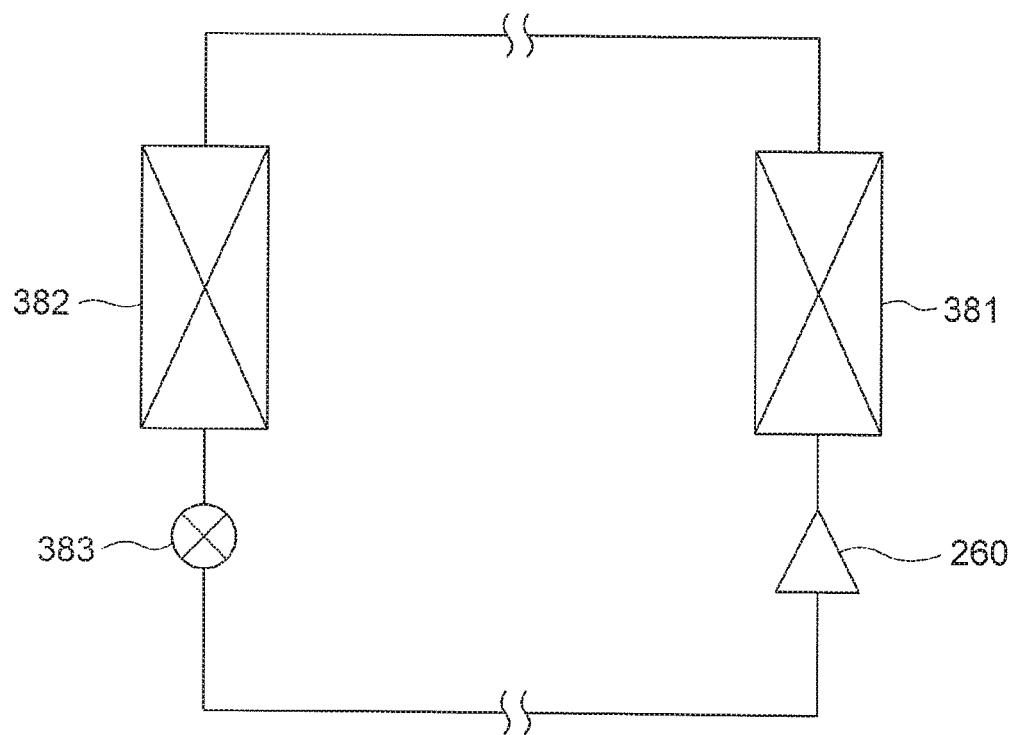
FIG. 13 is a view for illustrating a refrigeration and air conditioning apparatus according to a fifth embodiment of the present invention.

Further, as exemplified in FIG. 13, the present invention may also be carried out as a refrigeration and air conditioning apparatus 380 including the above-mentioned rotary compressor 260 as a component of a refrigeration cycle. The refrigeration cycle of the refrigeration and air conditioning apparatus 380 includes at least a condenser 331, an evaporator 382, and an expansion device 383. However, the configuration of components other than the compressor, including the condenser 381, the evaporator 382, and the expansion device 383, is not particularly limited.

In the above, the details of the present invention are specifically described referring to the preferred embodiments. However, it is apparent to those skilled in the art that various modifications may be made based on the basic technical concept and the teachings of the present invention.

REFERENCE SIGNS LIST 1 interior permanent magnet motor, 3 stator, 5 rotor, 5a rotor outer peripheral surface, 11 rotor core, 15 air gap, 19 permanent magnet, 21 magnet insertion hole, 31, 131 slit, 41 first portion, 260 rotary compressor, 261 airtight container, 380 refrigeration and air conditioning apparatus

The invention claimed is:

1. An interior permanent magnet motor, comprising:
a rotor comprising a plurality of permanent magnets; and
a stator,
wherein the rotor further comprises a rotor core,
wherein the rotor core has a plurality of magnet insertion holes,
wherein a plurality of slits are formed in a region of the rotor core, wherein the region of the rotor core is located on a radially outer side of the magnet insertion holes, and a width center line of each of the slits along a long axis direction of each of the slits is parallel to a corresponding magnetic pole centerline, and
wherein at least two of the slits are formed so that a core region sandwiched between the two slits has a portion increased toward a radially outer peripheral surface of the rotor core.

2. An interior permanent magnet motor according to claim 1,
wherein the plurality of slits comprise first portions, respectively,
wherein each of the first portions is positioned away from a corresponding magnetic pole center line side of the slit, and is located in the slit at the width center line of the slit and a rotor outer peripheral surface side of the slit, and
wherein a distance from the magnetic pole center line to the each of the first portions becomes larger from a radially outer side of the magnet insertion holes to a radially outer peripheral surface of the rotor core.

3. An interior permanent magnet motor according to claim 1, wherein an outermost end of the each of the slits is located on an outer side of the width center line of the each of the slits.

4. An interior permanent magnet motor according to claim 1,
wherein each of the permanent magnets is curved into an arc shape, and
wherein the each of the permanent magnets is arranged so that a convex portion side of the arc shape is located on a center side of the rotor.

5. An interior permanent magnet motor according to claim 1,
wherein a magnetic pole center region on the outer peripheral surface of the rotor bulges toward the radially outer side to a higher degree than an inter-pole region on the outer peripheral surface of the rotor, and
wherein an air gap between the stator and the inter-pole region of the rotor is larger than an air gap between the stator and the magnetic pole center region of the rotor.

6. An interior permanent magnet motor according to claim 1,
wherein the each of the permanent magnets comprises a ferrite magnet or a rare-earth magnet.

7. A compressor, comprising, in an airtight container:
a motor; and
a compression element,
wherein the motor comprises the interior permanent magnet motor of claim 1.

8. A refrigeration and air conditioning apparatus, comprising the compressor of claim 7 as a component of a refrigeration cycle.

9. An interior permanent magnet motor according to claim 1, wherein
a width of each of the at least two slits is substantially constant on a magnet insertion hole side of the slit, and each of the at least two slits has a tapered portion on the rotor outer peripheral surface side of the slit.

* * * * *